UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD OF OBTAINING TITANIC OXID.

1,201,541.  Specification of Letters Patent.  Patented Oct. 17, 1916.

No Drawing.  Application filed March 7, 1916. Serial No. 82,558.

*To all whom it may concern:*

Be it known that I, LOUIS E. BARTON, a citizen of the United States, and a resident of Niagara Falls, in the county of Niagara and State of New York, have invented certain new and useful Improvements in Methods of Obtaining Titanic Oxid, of which the following is a specification.

My present invention relates to the obtaining of titanic oxid concentrates from titaniferous and ferruginous substances, such for example, as ilmenite ores, and more particularly to such methods for so doing as are disclosed in Letters Patent granted to Auguste J. Rossi and myself, Nos. 1,106,409 and 1,106,410, dated August 11th, 1914, and No. 1,171,542, dated February 15, 1916.

The objects of my present invention comprise provision of novel steps in the practice of such, or similar methods whereby their final products are attainable more readily, safely, and economically, and of more desirable quality for certain purposes.

Reference to the said Letters Patent will disclose the methods, processes, and products therein described and claimed, the which may, for the purposes of this specification, be summarized as follows, viz: The titaniferous ferruginous substances treated, such, for example, as ordinary titaniferous or ilmenite, ores were melted in the presence of sulfid of an alkali metal either charged as such, or produced by reactions in the charge, during its melting from therewith mixed carbonaceous material and sulfid of an alkali metal. The resulting melts were then preferably after, or without, lixiviation with water, heated in a bath containing sulfuric or hydrochloric acid so dilute as to dissolve the therein iron, and other, compounds, rather than those of titanium; and, finally, the insoluble residues being withdrawn were washed, dried, and, if desired, calcined, the resulting, usually powdered, product being, prior to calcination, darkish to light gray in color, or, if calcined, yellowish, and distinguished by analysis, as consisting principally of titanic oxid, the percentage of which was somewhat increased by calcination, and as containing also some soda and sulfuric anhydrid, and a relatively small quantity of iron oxid; one of the most notable and useful distinguishing characteristics of said products being the exceptional ease, rapidity, and completeness with which they are soluble in concentrated sulfuric, or other acid.

When the sulfids produced in the melts of said patented processes, or in the sintered products of my analogous process for which I am applying for Letters Patent cotemporaneously herewith, are treated as aforesaid with sulfuric or hydrochloric acids, a chemical equivalent of hydrogen sulfid gas is evolved. For example with iron sulfid, we have (1.) $FeS + H_2SO_4 = FeSO_4 + H_2S$ The well known character and effects of hydrogen sulfid indicate the desirability of dispensing, as far as possible, with its production. My present invention is based on my discovery that this can be accomplished by aid of suitable methods of operation hereinafter described, in which chlorin is used instead of acids in the aforesaid treatments of the said sulfid melts, or their equivalents.

My present improvement is based upon the fact that ferrous sulfid is decomposed at certain relatively low temperatures with formation of ferrous chlorid; thus (2.) $FeS + 2Cl = FeCl_2 + S$ My improvement is practised as follows, viz: Taking the sulfid melt, or the sintered product, of one of the said patented processes containing sulfid and titanate of the alkali metal, ferrous sulfids, and silicates and aluminates of soda, I treat it to immersion in a bath of water of about five times its weight. At this stage some alkali-iron sulfid solution may, if desired, be separated from the insoluble titanium and iron compounds, as by filtration, or the solution containing insoluble matter may be directly subjected to the next step of my method. This consists in incorporating chlorin into the bath, or solution containing the suspended matter.

It is important that excess chlorin be avoided as much as possible in order to prevent undesirably great oxidation of the iron compounds with consequent iron oxid contamination of the final titanic oxid product; also that the bath be agitated sufficiently to promote or assist suspension therein of solids.

The chlorin may be obtained from any source, for example, as produced by the Welden, or the Deacon, processes, or as obtainable in gaseous or liquid form from the electrolytic manufacture of alkali and chlorin. But, inasmuch as chlorin from such sources is comparatively expensive, and comparatively unproductive of certain conditions most desirable in the bath, I prefer to add to the latter sodium chlorid (common salt) in quantity equal to 1.6 to 2 times the sodium sulfid, plus 1.4 to 2 times the iron sulfid found, by analysis, in the melt to be treated. My said bath, or solution containing suspended matter, I make the anolyte in an electrolytic cell provided with a diaphragm, using as the catholyte a 5% solution of sodium chlorid (common salt), and I electrolyze the same between suitable electrodes, such as a graphite positive and an iron negative, employing a current having an electromotive force of about five volts. The anode compartment should be provided with suitable means for agitating the solution and therein suspended solids, and the cell should be of such construction as to facilitate cooling, as by radiation. Such means and constructions are too well known for description here. The chlorin liberated at the anode acts immediately upon the sulfids present, as indicated by the equation (2) above given, and also as follows:

(3.) $Na_2S + 2Cl = 2NaCl + S$.

As will be seen from these equations, free sulfur is a product of the reactions, and can be recovered and utilized with advantage. Also a quantity of sodium hydroxid chemically equivalent to the chlorin is liberated at the cathode and can also be, as will be understood, recovered and utilized.

By operating as last described, no free chlorin is present so long as there are sulfids remaining undecomposed. The point at which to discontinue the electrolysis is readily determined by withdrawing a sample of the suspended matter and examining it for sulfids, their absence indicating completion of the desired reactions.

After the electrolysis, the titanic oxid product is obtained from the bath, as by filtration, and, as usual, washed, dried, and, if desired, calcined.

What I claim as new and desire to secure by Letters Patent is the following, viz:

1. The method of obtaining titanic oxid from titaniferous-ferruginous material, which comprises heating said material in presence of sulfid of an alkali metal to formation of ferrous sulfid or of ferro-sodium sulfid, and subjecting the resulting product to the action of chlorin in an aqueous bath.

2. The method of obtaining titanic oxid from titaniferous-ferruginous material which comprises heating said material in presence of sulfid of an alkali metal to formation of ferrous sulfid or of ferro-sodium sulfid, incorporating the resulting product into an aqueous bath, adding sodium chlorid to, and electrolyzing said bath.

3. In the treatment of a bath, the solids of which consist principally of titanic oxid, titanate of an alkali metal, and ferro-sodium sulfids, the step which consists in incorporating chlorin into said bath in quantity sufficient to insure decomposition and solution of sodium sulfids and iron sulfids present.

LOUIS E. BARTON.

Witnesses:
B. C. POTTER,
T. C. GRAHAM.